United States Patent [19]
Fukuma et al.

[11] 3,760,052
[45] Sept. 18, 1973

[54] MANUFACTURE OF CONJUGATED SHEATH-CORE TYPE COMPOSITE FIBERS

[75] Inventors: Norboru Fukuma; Hiroshi Chayamichi; Toshio Okamoto; Hiroshi Henmi, all of Nobeoka, Japan

[73] Assignee: Asahi Chemical Industry Company Limited, Osaka, Japan

[22] Filed: May 24, 1971

[21] Appl. No.: 146,475

Related U.S. Application Data

[60] Continuation of Ser. No. 822,333, Jan. 16, 1969, abandoned, Division of Ser. No. 641,617, May 26, 1967.

[30] Foreign Application Priority Data
May 28, 1966   Japan.............................. 41/33875
Aug. 10, 1966   Japan.............................. 41/52111

[52] U.S. Cl.................. 264/171, 264/168, 264/174, 425/131, 425/133
[51] Int. Cl............................................. B29f 3/10
[58] Field of Search.................. 264/171, 168, 174; 425/131, 133; 161/175, 176, 177

[56] References Cited
UNITED STATES PATENTS

| | | | |
|---|---|---|---|
| 3,244,785 | 4/1966 | Hollandsworth..................... | 264/171 |
| 2,790,202 | 4/1957 | Lovenian ............................ | 18/13 |
| 3,459,846 | 8/1969 | Matsui et al. ...................... | 264/171 |
| 3,461,197 | 8/1969 | Lemelson........................... | 264/172 |
| 3,531,368 | 9/1970 | Okamoto et al. .................... | 264/171 |
| 3,540,080 | 11/1970 | Goossens........................... | 264/171 |

*Primary Examiner*—Jay H. Woo
*Attorney*—Richard C. Sughrue et al.

[57] ABSTRACT

1. A conjugated sheath-core type composite fiber, wherein the core is arranged concentrically with the sheath and composed of two different spinning materials conjugated to each other.

2. A process for the manufacture of conjugated sheath-core type of composite fibers, comprising for each fiber the following steps of : conjoining two different spinning materials so as to form a conjugated core; supplying a different spinning material around the thus conjoined core mass in a concentric manner so as to form a sheath; and extruding the thus conjugated core-and-sheath mass through a discharge opening.

3. A spinneret assembly for the manufacture of conjugated sheath-core type composite filaments, having a number of spinneret elements, wherein each of the latter contains a conjugating zone for two different spinning materials destined for the core; a sheath-forming and conjugating zone to form a concentric sheath around the thus conjugated core mass and an extruding zone for extruding the thus conjugated core-and-sheath through a discharge opening.

List of References:
 (1) Great Britain, Patent Specification No. 760,179 of Oct. 31, 1956, granted to Paul Halbig.
 (2) Great Britain, Patent Specification No. 805,033 of Nov. 26, 1958, granted to E.I. Du Pont Nemours and Company, corresponding to U.S. Pat. No. 2,931,091.
 (3) Great Britain, Patent Specification No. 896,955 of May 23, 1962, granted to E.I. Du Pont Nemours and Company.

8 Claims, 12 Drawing Figures

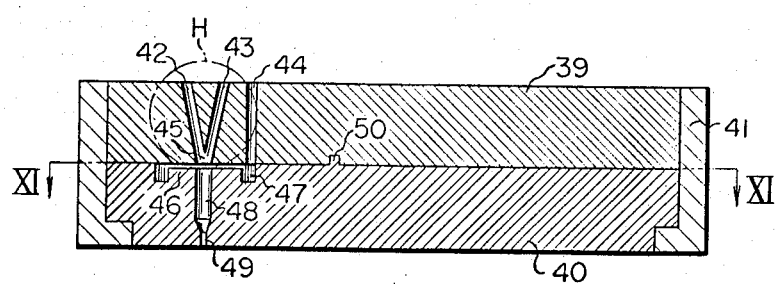
FIG. 9
FIG. 11
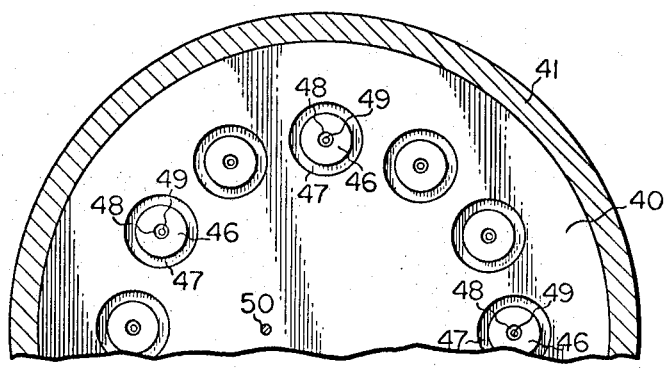
FIG. 10
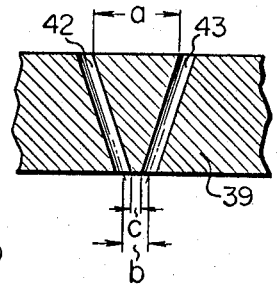
FIG. 12
(I)
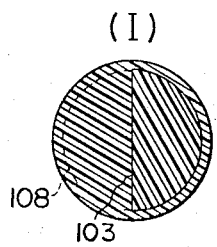
(J)
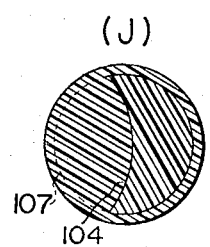
(K)
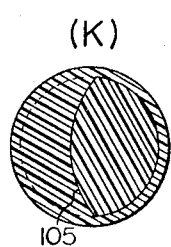
(L)
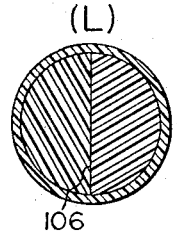
(M)
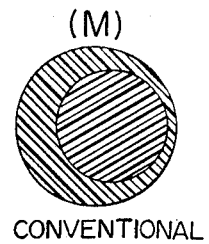
CONVENTIONAL

MANUFACTURE OF CONJUGATED SHEATH-CORE TYPE COMPOSITE FIBERS

This application is a continuing application of U.S. application Ser. No. 822,333, filed Jan. 16, 1969, which application was a divisional application of U.S. application Ser. No. 641,617, filed May 26, 1967. The present application claims priority based upon Japanese application No. 33875/1966, filed May 28, 1966, and Japanese application No. 52111/1966, filed on Aug. 10, 1966.

This invention relates to improvements in and relating to the manufacture of conjugated sheath-core type composite fibers or filaments which are permanently crimped or crimpable by virtue of the different shrinking characteristics of the components of a fiber.

Conventional fiber of the above kind has an eccentric core extending the overall length of the fiber and having a circular cross-section enclosed by the sheath.

According to our practical experience, however, it is definitely observed that the crimping performance of this kind of conventional fiber is not enough to meet with practical demands.

This defficiency is attributable to such fact that in order to attain enough crimpability it is necessary to provide the core per se with a satisfactory anisotropy in radial directions and regarding its cross-sectional configuration and/or its material composition. When the core of a composite fiber comprises a sole fiber material and has a circular cross-section as in the conventional technique, although the core is eccentric to the sheath as referred to above, the core per se does not represent considerable crimp performance.

Another problem inherent in the conventional fiber or filament resides in the very difficulty in the alteration of the relative cross-sectional arrangement between the core and the sheath of the fiber. Attaining this effect is not absolutely impossibe, but, for this purpose a highly complicated spinneret must be used. Especially, in this case, a constant rate of feed of the spinning material and that of the extrusion are highly difficult to realize.

It is therefore the main object of the present invention to provide a unique and substantially improved composite fibers or filaments of conjugated sheath-core type, capable of developing higher degree of crimps.

Another object is to provide a fiber of the above kind, having a stabilized relative cross-sectional position of the core and the sheath, by means of a highly simplified spinneret assembly.

Still another object of the present invention is to provide a unique technique for the manufacture of the novel type of fibers of the above kind.

The novel composite fiber according to this invention and of conjugated sheath-core type comprises two or more kinds of spinning materials, preferably polymers, copolymers and the like, extruded simultaneously from a spinneret opening and the core being concentric to the outer sheath and having substantially a specifically intended shape along the entire length of the fiber or filament, such as semi-circle, crescent, convex lens or the like, when considering a single filament.

When a composite fiber according to this invention comprises three different kinds of spinning material, the physical composition may be, for instance, such that the core consists of two different materials and concentrically enclosed by the sheath consisting of the third or remaining spinning material. According to the spinning process and with use of the spinning apparatus according to this invention, a large number of fibers of this highly complicated composite nature provided by three different spinning materials can be produced in a highly simplified and efficient manner, and indeed, in a single extrusion process.

As will be seen at a later stage of the description, the novel fiber or filament is a kind of combination of a conjointed composite fiber with a conjugated sheath core type fiber.

This kind of fiber or filament is perfectly novel and may represent various crimp and/or dying characteristics, by properly selecting different spinning materials.

The spinning material employable in this invention comprises one or more of polymers or copolymers which have fiber-forming property. The material is used in the form of a solution in a suitable solvent commonly employed in the art. Or alternatively, the material may be in its fused molten state.

As the spinning materials, known and various polymers and copolymers of polymide-, polyester-, polyolefine, polyester ether-, polyacryl-, polyvinyl chloride, polyvinyliden chloride-, polyurethane-, polyurea- and the like series, may be utilized, Cellulose series compounds may also be used.

In order to manufacture the aforementioned novel and improved composite fibers, it is proposed to employ, according to a further feature of the invention a process for the manufacture of a conjugated sheath-core type composite fiber, comprising: conjoining two different spinning materials together at an intermediate zone of a flow passage consisting of a spinneret; leading a further spinning material different in its kind from the both or same in its kind as one of said both materials to said zone or to a downstream zone from said conjoining zone, for the formation of a closed sheath around the conjointed mass; and extruding the thus formed sheath-core combination through a spinneret opening.

It would not absolutely impossible to manufacture the aforementioned novel and improved composite fibers by conventional spinning apparatus. In such cases, however, complicated spinning material rating appliances are necessary to employ for supplying core material or materials and sheath material in a specific and predetermined relative ratio, in order to produce a specific cross-sectional configuration of the composite and conjugated filament substantially along its whole length, especially for the realization of the required variable, yet predetermined wall thicknesses of the sheath and for producing a sharp separating surface between the core and the sheath. In addition thereto, pressure regulators are necessarily to fit in order to meet the abovementioned complicated material delivery requirements. Still further, high precision workmanship is necessary in the manufacture of the spinneret, in addition to precisely controlled maintenance conditions.

For the manufacture of the novel fibers according to this invention and for obviating the aforementioned difficulties which must be taken into consideration when relying upon the conventional spinneret technique, the invention further proposes a spinneret assembly for the manufacture of conjugated sheath-core type composite filaments, comprising a number of spinneret elements formed in said assembly, each of said elements being characterized by the provision of two separate inlet passages for the receiption of core component materials, another or outlet extremities of said passages being arranged to keep fluid communication with each other so as to form a conjoining zone for said core materials; a third passage for the reception of a sheath material; a sheath-forming zone arranged concentrically, when viewed in plan, to said conjoining zone and kept in fluid communication with the latter as well as said third passage; and a spinneret opening leading from said sheath-forming zone for receiving from the latter and extruding the conjugated sheath-core type conjugated filament of specific strength.

These and further objects, features and advantages of the present invention will appear more specifically in the following detailed description of several embodiments of the novel filaments, as well as those of the apparatus adapted for the manufacture thereof, said embodiments being shown however only for the illustrative purpose and thus in no limiting sense of the invention.

A preferred spinning apparatus for the manufacture of the said novel fibers or filaments according to this invention, there are provided three feed pumps, preferably of gear type, arranged to deliver three different kinds of spinning material, two materials of which are conjoined together at an intermediate point or zone formed in the conduit system provided in a spinneret assembly, and a third spinning material which is fed from the third feed pump and may be, under circumstances, same as the first or second material, as the case may be, is so led within the spinneret conduit at a downstream zone from the said conjoining zone that it will completely enclose said conjointed and flowing material, in the form of a sheath and a core. Under circumstances, the first and the second component material fed from respective pumps are brought into joining together, and the third material fed from the third feed pump is so led at the very conjoining zone that it encloses the conjoined core mass.

In the drawings:

FIG. 9 is an axially sectional view of the second modification shown in FIGS. 8–9.

FIG. 10 is an enlarged sectional view of the part of FIG. 9 which is substantially encircled by a small chain-dotted circle denoted H.

FIG. 11 is part of a horizontally sectional view, taken substantially along a section line XI—XI in FIG. 9.

Figure 1:
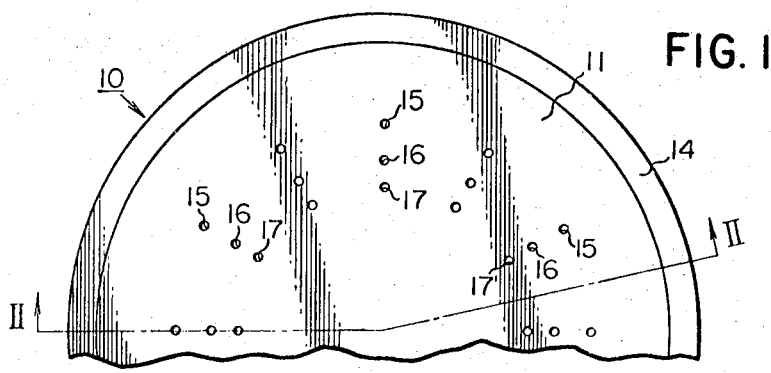
FIG. 1 is a top plan view of part of a spinneret assembly as comprising only 10 spinneret elements, for a clear representation of the drawing.

FIG. 12 comprises several cross-sectional views of several novel filaments according to this invention, in comparison with that of a comparative conventional filament shown at (M).

Now referring to the drawings, especially FIGS. 1–4 thereof, illustrative of an embodiment of the novel spinneret assembly at 10, embodying the principles of the present invention; numeral 11 denotes upper top plate; 12 intermediate plate and 13 bottom plate, all of said plates being preferably formed into respective discs of a same diameter, as shown. Upper plate 11 is formed with a plurality of sets of inlet conduits 15, 16 and 17, each set of said conduits being bored completely through the disc and arranged in a row and all the sets being arranged preferably in a radial symmetry, as shown.

Intermediate plate 12 is formed with vertical conduits 18 and 20 and a horizontally extending connecting or conjoining conduit 19 kept in communication with the lowermost ends of conduits 15 and 16, on the one hand, and with the upper end of conduit 20, on the other. Conduit 18 is kept in communication with conduit 17, as shown. Although not shown specifically, as equal number of sets of said conduit group 18–20 are provided, to the number of those of conduit group 15–17. Around the lowermost end of each of said conduits 20, there is a small depending projection at 21, these projections being shown only one in FIG. 2 for simplicity of the drawing.

Figure 2:
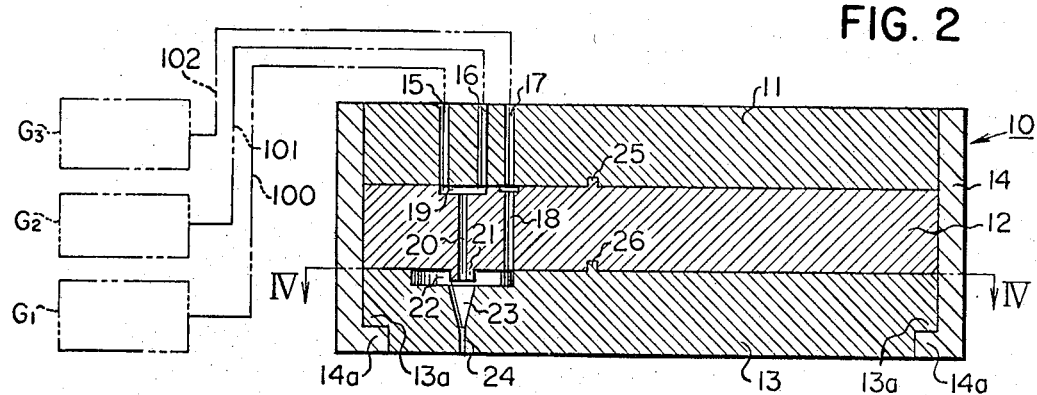
FIG. 2 is an axially sectional view of the assembly shown in FIG. 1, taken along a sectional line II—II shown therein, together with three feed pumps and related feed pipings shown only schematically by chain-dotted lines.
Figure 3:
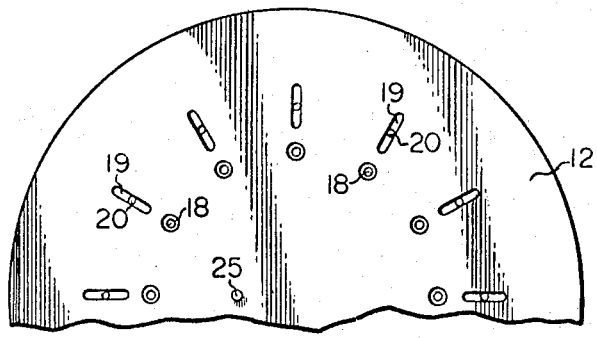
FIG. 3 is a top plan view of part of the intermediate plate comprised in the spinneret assembly shown in several foregoing FIGURES.
Figure 4:
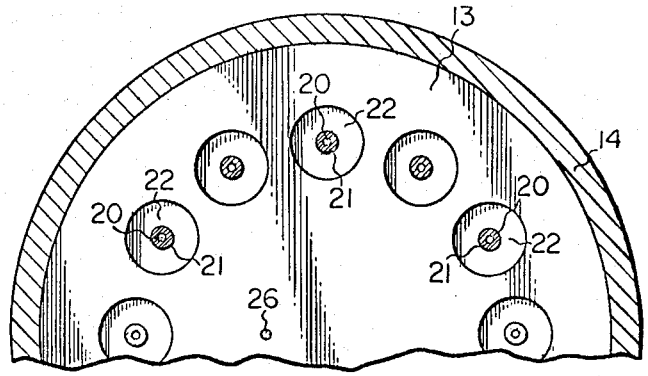
FIG. 4 is a horizontally sectional view taken substantially along a sectional line IV—IV in FIG. 2.

Bottom plate 13 is formed in the upper surface with a number of recesses 22, each of which is arranged concentrically with a respective one of said projections 21 and kept in communication with conduits 18 and 20, when three plates 11–13 are assembled together as shown in FIG. 2. From the center of said recess 22, a further conduit extends vertically through the bottom plate 13, which donduit comprises a first part 23 having a form of an inverted cone and a second part 24 having substantially a cylindrical shape, so as to establish an outlet opening.

As shown in FIG. 2, three plates 11 – 13 are assembled together in an overlapped manner and there are provided a tongue-and-groove centering means 25 or 26 between each pair of said plates 11 – 12 or 12 – 13, respectively, for assuring their relative correct position as shown. These plates 11 – 13 are encased by a cylindrical case 14 which is formed with an inwardly directing bottom flange 14a adapted to snugly engage with a shoulder 13a formed on the bottom plate 13, thereby supporting the assembled and centered plate assembly 11 – 13.

Conventional metering pump G1, preferably of gear type, is connected through a feed piping 100 to the upper extremity of first inlet conduit 15. In the similar way, metering pumps G2 and G3, again preferably of gear type, are connected through feed pipings 101 and 102 to the upper extremities of second and third inlet conduits 16 and 17, respectively. Naturally, the connection between each pair of feed piping and inlet conduits is made by conventional pipe fittings such as nipples, although not shown. In FIG. 2, said pumps and said feed pipings are shown only schematically by chain-dotted lines on account of their very familiarity.

In the operation of the composite and multi-hole spinneret assembly, a first spinning material such as polyamide copolymer is fed from the first pump G1 through piping 100 to the first inlet conduit 15. At the same time, a second spinning material such as nylon-6 polymer is fed from the second pump G2 through piping 101 to second inlet conduit 16.

Thus, the first and the second spinning materials of different physical properties, especially climp potencies, are led through both inlet conduits 15 and 16, respectively, to junction conduit 19 where they are conjoined together, thence through the common conduit 20 and a thin gap formed below the lowermost extremity of the latter conduit into the cone conduit 23. On the other hand, a third spinning material such as nylon 66 salt or hexamethylenediamine adipate is fed from the third pump G3 through feed piping 102 to third inlet conduit 17, thence through intermediate conduit 18 into the recess 22. Thanks to the concentric arrangement of this recess 22 relative to the conduit 20 and depending projection 21, the fed third material will occupy the ring space formed around the latter within the recess 22 and to form a sheath around the conjoined core material injected from conduit 20 into the cone 23. The thus formed, conjugated sheath-core type composite filament in its plastic state will be extruded from the outlet opening at 24.

Figure 5:
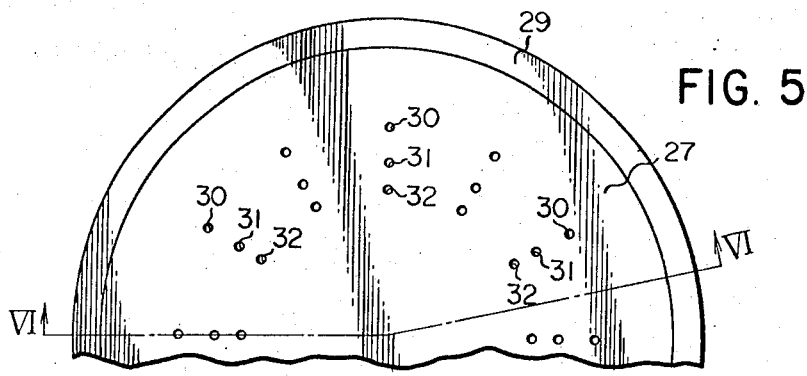
FIG. 5 is part of a top plan view, illustrative of a modified spineret assembly from that shown in the foregoing FIGURES.
Figure 6:
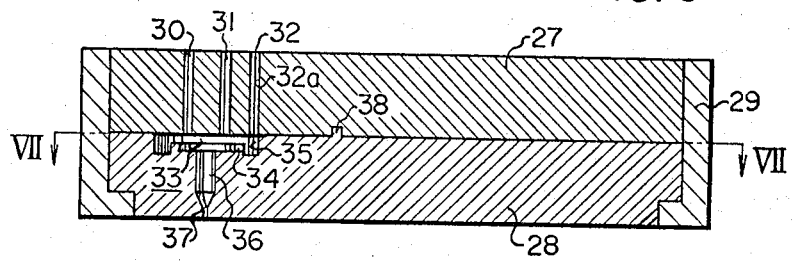
FIG. 6 is an axially sectional view of said modification.
Figure 7:
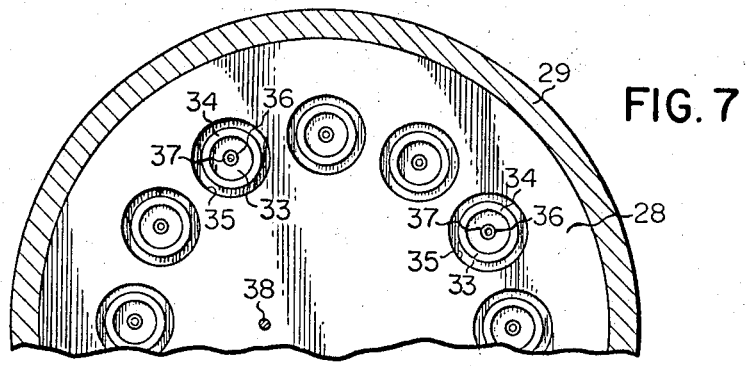
FIG. 7 is part of a horizontal section of said modification, taken substantially along a sectional line VII—VII.
Figure 8:
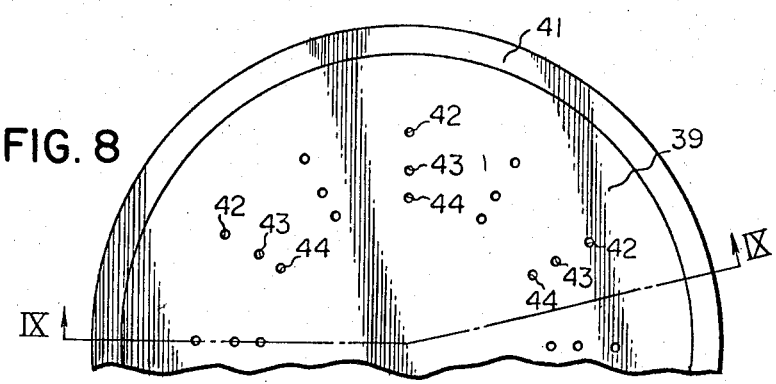
FIG. 8 is part of a top plan view of a still further modified spinneret assembly.

In a modification, shown in FIGS. 5–7, from the foregoing, the spinneret assembly comprises upper or back plate 27, lower or spinneret plate 28 and a case or holder 29, corresponding to that of 14 in the foregoing embodiment.

Upper plate 27 is formed with a group of inlet conduits 30, 31 and 32 as in the same way with those denoted 15–17 in the foregoing embodiment. For positioning the both plates 27–28, there is provided a tongue-and groove connection at 38 between the both for keeping them in a specific relative position.

In correspondence to each of conduit group comprising conduits 30–32, a material-receiving space or recess at 33 is formed in a circle in the upper surface of lower plate 28, the peripheral wall surface at 35 being in registration with the innermost wall part at 32a of conduit 32. Said recess 33 is formed with a concentric circular ring projection 34 for dividing the space 33 into an outer ring zone and an inner disc-like zone, said both zones being however kept in communication with each other through a reduced passage defined by the bottom surface of upper plate 27 and the ring projection 34.

From the center of said inner disc like zone of the material receiving space 33, a common conduit 36 extends downwards and is connected through a cone-shaped junction to an outlet opening at 37. Although not shown, metering pumps such as those G1, G2, and G3 in the foregoing embodiment are connected through respective pipings such as 100–102 to the inlet conduits 30–32, respectively, as before, although not shown.

In the operation of the present modified spinneret, a first and a second spinning material of different physical properties are fed from respective gear pumps through feed pipings to inlet conduits 30 and 31, thence to the material-reception space 33 and within its central zone defined by the circular ring projection 34, thus the both materials being conjoined or conjugated together. Simultaneously, a third spinning material having a further different physical property is fed from the third gear pump through the attributed piping to the third inlet conduit 32, thence into the outer ring zone of said space 33. This third material will invade into the thinner central zone in such a manner that it encloses the conjoined core mass consisting of the first and the second material prevailing in the central zone. In this way, a conjugated sheath core type composite filament will be extruded from the outlet opening 37. Naturally in this case, the core consists of the first and second material, while the sheath comprises the third material.

The design and operation referred to above in the present modification relative to one spinneret element also apply to all other spinneret elements arranged radially as shown in the spinneret assembly.

In a still further modified arrangement shown in FIGS. 8–11, upper or back plate 39, lower or spinneret plate 40 and case or holder 41 are provided in the similar way as in the foregoing first modification. Although the upper plate 39 is again formed with three inlet conduits at 42–44, the main difference from the foregoing modification resides in such that first and second inlet conduits 42 and 43 are joined together at their lower ends so as to form a conjoining zone at 45. Another difference comprises the provision of a land 46 defining a ring space 47 concentrically with the conjoining zone 45 as well as discharge conduit parts 48–49, all being formed in the lower plate 40. The discharge conduit 48–49 is formed vertically in registration with the conjoining zone. Centering means of tongue-and-groove type at 50 is also provided between the both plates 39 and 40 as before.

In the operation, a first and second spinning material are fed from a first and a second gear pump as before, through respective feed pipings to the first and the second inlet conduits at 42 and 43, thence to conjoining zone 45 for performing the conjoining of the both core materials together. Simultaneously, a third spinning material for sheath is fed from a third pump through its attributed feed piping to the third inlet conduit 44, thence to the ring space 47. This third material will then invade from all radial directions into the narrow gap defined between the bottom surface of upper plate 39 and the circular land 46, thereby enclosing the conjointed core material passing through the center of said gap into the upper enlarged part at 48 of the combined spinneret conduit including the lowermost discharge opening at 49. Thus, also in this case, a conjugated sheath-core type composite filament is extruded from the discharge opening 49. All other spinneret elements shown, comprising similar conduits, are of same design and operation and no further description would be necessary for understanding of the present modification.

In FIG. 10, an enlarged sectional view is shown of a part of the spinneret assembly as encircled by a small chain-dotted circle denoted H.

In order to produce a continuous filament of the above kind and having a constant cross-sectional configuration along its entire length, it is recommendable to use the improved upper plate 39 shown partially in FIG. 10, in place of that denoted 27 in FIG. 6. According to our practical experiments, dimensions for $a$, $b$ and $c$ may preferably be as follows:

$$a \geq 2 \text{ mm}; \ b \leq 0.5 \text{ mm}; \ c = 0$$

In the spinneret assembly proposed by the present invention, the bottom or spinneret plate 13 (FIG. 2), 28 (FIG. 6) and 40 (FIG. 9) may be replaced with each other when occasion desires it. Therefore, the spinneret assembly should not be limited to those embodiments so far shown and described. It should be further noted that the third spinning material may be same as the first or second material when so desired. In this case, the number of spinning gear pumps may be reduced from three or two.

The conjugated sheath-core type composite filaments have generally a cross-sectional configuration as shown at (L) in FIG. 12.

When the third spinning material for sheath is same as the first or second material, as the case may be of the core, the cross-sectional configuration shown at (I), (J) or (K) in the same FIGURE. With use of three spinning pumps for the spinneret assembly for feeding the spinning materials in metered quantities, the relative cross-areas of components consisting the conjugated sheath-core type composite filament can be precisely controled for obtaining a specific crimp performance which means a considerable progress in the art.

When the filament is spun from only two different kinds of spinning material, the number of feed pumps may be reduced from three to two as was already referred to. In this case, one of these pumps is preferably arranged to feed the material to both inlet conduits 15 and 17, 30 and 32 or 42 and 44. In this case, however, precise workmanship is necessary to finish the various parts of the spinneret, especially its passage conduits, for obtaining spun filaments of a specifically desired cross-section. The occasional filament cross-section of a specific configuration as shown by way of example at (I), (J) or (K) depends upon the kind and nature of the two spinning materials to be conjointed together. The conjugated core material should preferably have a higher viscosity than that of the sheath material.

It will be easily noted from the foregoing that the filaments according to the invention comprise concentric cores to the respective sheaths and that each of the core comprises two conjugated materials of different physical properties with each other, especially crimp potencies, the conjugating surface being concave as at 104, convex as at 105 or even straight as at 103 and 106, as the case may be, as shown in several model sketches in FIG. 12. In practice, however, the conjugating surface may represent a form of ripple. It will be further seen that the filament according to the invention represents various radial crimp potencies resulting especially from the fact that the core comprises two different spinning materials and represents a clear conjugating surface formed therein.

In certain occasions, the conduit 20 may be slightly out of registration with the spinneret conduit 23–24. This modified design will apply to the spinnerets shown in FIGS. 5 and 9, respectively.

In the following, several numerical examples of the spinning process according to this invention will be given for better understanding of the invention and in no limiting sense thereof. In these examples, relative viscosities of polyamides are given relative to a 95.5 percent sulfuric acid used for solvent. Parts are given by weight, it not otherwise specified.

EXAMPLE 1

Fifty parts of ε-caprolactam, 25 parts of nylon 66 salt (hexamethylenediamine adipate) and 25 parts of nylon 6–10 salt (hexamethylenediamine sebacate) were introduced in an autoclave and polymerized in the conventional way, thus obtaining a terpolyamide having a relative viscosity of 2.5. Separately, a homopolyamide consisting exclusively of ε-caprolactam and having a relative viscosity of 2.3 was prepared according to the conventional technique.

For carrying out the spinning process, the spinneret shown in FIGS. 1–4 and described hereinbefore was employed. In this case, each thickness of the plates 11, 12 and 13 amounted to 10 mm. The bore of each of the conduits 15, 16, 17, 18 and 20 was 1 mm $\phi$. Bore of outlet opening 24:0.3 mm. Diameter of pitch circle passing through all the centers of said openings: 100 mm. Number of holes 24 was 10.

From a quantity of the feed pump G1, the terpolyamide, and from the pumps G2 and G3 different quantities of the homopoly amide were fed in a volumetric ratio of 40:40:20 to respective inlet conduits 15, 16 and 17.

The spinneret was kept at 290°C and the material was extruded therefrom at a rate of 8 g per minute per filament and the spun filament was wound up at a speed of 400 m per minute. The spun fiber before draft was 180 denier/10 filaments which were then subjected to a cold drawing, 3.56 times of the initial. The thus drawn product was finally treated in a boiled water bath, 100°C, for 10 minutes. The product, microscopically having a cross-sectional configuration as shown at (J) in FIG. 12, represented 65 crimps per inch in the mean, thus showing a satisfactory crimp performance. In FIG. 12, the dotted line at 107 representing a separating surface between the core and the sheath did not appear in this case.

EXAMPLE 2

A copolymer having a molecular weight: 78,000 and obtained from 91.5 parts of acrylonitrile, 8.0 parts of methyl acrylate and 0.5 part of methacryl sulfonate, hereinafter called stock A, and polyacrylonitrile having a molecular weight: 80,000, hereinafter called stock B were prepared. As the solvent, a 70 percent nitric acid, well refined to reduce the contained nitrous acid to 0.0003 percent, was employed.

The first spinning material comprised only the stock A and the second one consisted of a 60:60 mixture of said stocks A and B. For the latter purpose, these stocks were dissolved in a proper quantity of the solvent at $-3°C$ so as to represent a viscosity of 800 poises at 0°C.

With use of the first embodiment of spinneret assembly shown in FIGS. 1–4, the first material was fed to first inlet conduit 15 and the second material supplied to both second and third conduits 16 and 17, so as to perform a composite spinning by extruding the composite material into a 33 percent - aqueous sulfuric acid kept at $-3°C$. The spinneret assembly was provided with 200 spinneret openings, each being of 0.08 mm diameter. The take-up speed of the filaments from the coagulation bath amounted to 6 m/min. The gel-state filaments were passed through a rinsing water bath to carry out the washing to a satisfying degree and then subjected to a stretching step in a boiling water, 100°C, to stretch the stock seven times the original length. Upon thus stretched, the product was subjected to a solvent treatment as usual and the filaments were dried up by passing them through an infra-red drier. The filament of this dried yarn represented a cross-sectional configuration as shown at (I) in FIG. 12. By steaming at 120°C for 10 minutes, 67 crimps developed in the mean on the filament per inch. Separating surface shown therein at 108 was not apparent.

EXAMPLE 3

Using the modified spinneret assembly shown in FIGS. 5–7, nylon-6 polymer used in Example 1 was fed to first inlet conduit 30 and the copolymer used in the same prior Example was supplied under pressure to second inlet conduit 31, while nylon-66 polymer (hexamethylenediamine adipate) having a relative viscosity 2.5 was fed to third inlet conduit 32 for performing a composite spinning while using, as before, three different spinning pumps. The feed rate ratio was 25:25:50. The spinneret assembly was held at 290°C and the conjugated filaments were extruded at a rate of 8 g per minute per filament and taken up at 400 m/min. The titer of the undrawn yarn was 180 denier/10 filaments. The thus obtained undrawn yarn was subjected to a drawing step for increasing the original length to 3.56 times using a hot plate at 130°C and the drawn yarn was then treated in a boiling water bath, 100°C, for 10 minutes, for developing curled crimps, 66 crimps per inch in the mean. When this yarn was dyed with an acid dyestuff, "Alizarin Brilliant Sky Blue R" (manufactured by Farbenfabriken Bayer, Leverkusen, Germany), a clear and dark colored product was obtained. Cross section, see (K).

EXAMPLE 4

A polypropylene polymer and a propylene ethylene random copolymer containing 7 mol percent of ethylene were conjugatedly spun through the modified spinneret assembly shown in FIGS. 5–7. More specifically, said polypropylene polymer was fed to the first and third inlet conduits 30 and 32, while said propylene ethylene random copolymer was fed to the second inlet conduit 31. The spinneret assembly was held at 290°C and the spinning material was extruded at a rate of 4.6 g per minute per filament and taken up at 184 m per minute. In this case, feed pumps were three in number and the feed rates to inlet conduits 30, 31 and 32 was kept at a ratio of 45:45:10. The undrawn yarn represented 225 denier/12 filaments. This undrawn yarn was drafted to 2.45 times in length by means of a hot plate at 130°C and then subjected to a treatment in a boiling water bath, 100°C, for 10 minutes, thereby developing satisfactory crimps, such as 65 crimps per inch in the mean. The cross-sectional configuration of each filament was that shown in FIG. 12 at (I). Separating surface at 108 was not apparent.

EXAMPLE 5

While using the last embodiment of the spinneret assembly shown in FIGS. 8–11, nylon-6 polymer having a relative viscosity of 2.3 was fed to first inlet conduit 42 and a terpolyamide comprising ε-caprolactum 80 mol percent, nylon-66 salt 10 mol percent and nylon-6T salt (hexamethylenediamine terephthalate) 10 mol percent, having a relative viscosity of 2.4 was supplied to second inlet conduit 43, while nylon-6 polymer was fed to third inlet conduit 44 by means of respective feed pumps. The feed rate was 3:3:2. Extrusion was made through outlet openings 49. Spinning velocity was 1,000 m/min at 290°C. The spun undrawn yarn represented 480 denier/20 filaments. With use of hot pin kept at 130°C, the yarn was drafted to 4.3 times of length, thus representing 110 denier.

The spun and drafted yarn was wound up onto a bobbin and then rewound into a skein, which represented no crimps. This skein was dipped in a boiling water bath, 100°C, for 20 minutes. The thus treated yarn represented the following crimp characteristics.

Number of crimps: 53 per inch (in the mean)
Crimp elongation: 135 percent

The number of crimps was measured on the crimped filament for a length of an inch while imposing an initial load of 2 mg/denier. The crimp elongation was calculated from the following formula:

Crimp elongation = $(L_{50}-L_2)/L_2 \times 100$ (%)

Where, $L_2$ is the length of filament under the initial stress condition (2 mg/denier); $L_{50}$ is the elongated length of the same filament when an increased load, 50 mg/denier, was applied. The above definition will apply to Example 6 to be given. The microscopic cross-sectional configuration of each of the filaments in this case is schematically shown in FIG. 12 at (I).

In comparison with the results in this case, a comparative experiment was carried out in such a way that nylon 6 and a terpolyamide which have been referred to in Example 5 were conjugatedly spun from a comparative conventional side-by-side type spinneret. When the spun filaments were treated in a boiling water bath, a considerable sticking between filaments took place and could not provide crimped one.

EXAMPLE 6

Nylon 6 of the polymer disclosed in the foregoing Example was replaced by nylon 66 having a relative viscosity of 2.4. The spinning conditions were same as before, except that the spinneret was kept at 285°C.

The conjugatedly spun goods were finally subjected to a treatment in a boiling water bath, thereby developing the following crimp characteristics:

Number of crimps: 55 per inch (in the mean)
Crimp elongation: 113 percent

The goods were beautiful colored bulky yarns which were substantially equal in quality to false twisted bulky yarn of nylon 66.

EXAMPLE 7

Nylon 66 as the first spinning material was fed to first inlet conduit 15 of the first spinneret embodiment shown in FIG. 2, a copolymerized polyamide, as the second spinning material, prepared from ε-caprolactam and nylon 66 salt in a ratio of 55:45 was supplied to second inlet conduit 16, while nylon-6, as the third spinning material, having a relative viscosity of 2.3 was fed to third inlet conduit 17, for carrying out a conjugated spinning process as before. Volumetric feed ratio among said three spinning materials was set to ⅓: ⅓: ⅓. The spinning temperature was 280°C, the spinning velocity: 850 m/min.; the degree of drawing: 3.85 times; the temperature of hot plate: 135°C. The thus spun and drawn goods represented 70 denier/24 filaments.

The microscopic cross-sectional configuration is shown in FIG. 12 at (L). When the spun and drawn goods were subjected to a heat treatment in a boiling water bath, they developed beautiful and remarkable crimps, which products were highly adapted for use as knitting yarns.

As will be noted from the foregoing, the novel manufacturing process according to this invention for providing conjugated sheath-core type composite fibers may be carried into effect through the way of melt spinning, dry spinning or wet spinning, as occasion may desire.

It should be further noted that the nature and kind of the spinning material can be vastly altered or modified, practically there being no limitation in the selection.

Although only three embodiments are shown and described for illustrative purpose of the apparatus according to this invention, there may be made considerable change and modification thereto, so far as the aforementioned principles of the invention are embodied.

We claim:

1. In a process for the manufacture of a conjugated eccentric sheath-core type composite fiber consisting of a first and second spinning material for the core and the sheath, respectively, selected from the group consisting of polymers and copolymers of polyamide, polyester, polyolefin, polyetherester, polyvinyl chloride, polyvinylidene chloride, polyurethane, polyurea, and cellulose derivatives, the improvement which comprises:
   a. forming a stream of said first material delivered from a first supply source,
   b. forming a stream of said second material delivered from a second supply source,
   c. forming a third stream of said second material delivered from a third supply source,
   d. guiding said third stream into a circular ring zone surrounding said first and said second streams for the formation of a ring-shaped pool of said second material, and
   e. guiding the latter from said pool and substantially laterally to all the said streams through a circular feeding passage and towards said first and second streams for conjoining therewith, said first conjoining, said feeding and said second conjoining taking place on a lateral plane substantially perpendicular to said three streams so as to simultaneously form an eccentric two-component sheath-core,
   said first spinning material being formed into a crescent moon shape of said eccentric sheet-core type composite fiber.

2. The process of claim 1, where said first and second spinning materials comprise different fiber-forming polymers.

3. The process of claim 2, wherein the first spinning material is polyamide and the second spinning material is polyester.

4. The process of claim 1, wherein said first and second spinning materials comprise identical fiber-forming polymers.

5. The process of claim 2, wherein said polymer is employed in a molten state.

6. The process of claim 2, wherein said polymer is employed in the form of a solution.

7. The process of claim 4, wherein said polymer is employed in a molten state.

8. The process of claim 4, wherein said polymer is employed in the form of a solution.

* * * * *